(12) United States Patent
Park

(10) Patent No.: US 10,728,713 B2
(45) Date of Patent: Jul. 28, 2020

(54) RADIO CONTROL METHOD FOR VEHICLE AND SYSTEM FOR THE SAME

(71) Applicants: HYUNDAI MOTOR COMPANY, Seoul (KR); KIA MOTORS CORPORATION, Seoul (KR)

(72) Inventor: Jong Rae Park, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/125,502

(22) Filed: Sep. 7, 2018

(65) Prior Publication Data

US 2019/0182631 A1 Jun. 13, 2019

(30) Foreign Application Priority Data

Dec. 11, 2017 (KR) .......................... 10-2017-0169196

(51) Int. Cl.
*H04W 4/06* (2009.01)
*H04W 4/40* (2018.01)
*H04W 4/48* (2018.01)
*H04W 4/80* (2018.01)

(52) U.S. Cl.
CPC ............. *H04W 4/06* (2013.01); *H04W 4/40* (2018.02); *H04W 4/48* (2018.02); *H04W 4/80* (2018.02)

(58) Field of Classification Search
CPC . H04B 4/06; H04B 4/10; H04B 4/046; H04B 4/048; H04H 20/08; H04H 20/62; H04H 20/34; H04H 60/51; H04H 60/41; H04H 60/50; H04H 2201/13; H04W 4/06; H04W 4/48; H04W 4/80
See application file for complete search history.

(56) References Cited

U.S. PATENT DOCUMENTS

| | | | |
|---|---|---|---|
| 2010/0197255 A1* | 8/2010 | Jaisimha | H04H 60/51 455/186.2 |
| 2016/0211932 A1* | 7/2016 | Schmauderer | H04H 20/57 |
| 2017/0026067 A1* | 1/2017 | Thomas | H03J 1/0008 |
| 2017/0055077 A1* | 2/2017 | Merricks | H04W 4/80 |

FOREIGN PATENT DOCUMENTS

| | | | |
|---|---|---|---|
| KR | 10-2008-0083772 A | 9/2008 | |
| KR | 10-2011-0100781 A | 9/2011 | |

* cited by examiner

*Primary Examiner* — Thanh C Le
(74) *Attorney, Agent, or Firm* — McDonnell Boehnen Hulbert & Berghoff LLP

(57) ABSTRACT

A radio control method for a vehicle and a system for the same are disclosed. The method take advantage of radio data system (RDS) data in a radio broadcast system prevents unexpected initialization of a preset channel during utilization of a preset function. The radio control method for a vehicle includes receiving information about radio channel selection achieved by a preset function, and when the selected radio channel does not include radio data system (RDS) information, updating a preset slot in a manner that a new radio channel including the RDS information is designated to the preset slot.

16 Claims, 6 Drawing Sheets

RADIO CONTROL METHOD FOR VEHICLE AND SYSTEM FOR THE SAME

CROSS-REFERENCE TO RELATED APPLICATION

This application claims the benefit of Korean Patent Application No. 10-2017-0169196, filed on Dec. 11, 2017 in the Korean Intellectual Property Office, the disclosure of which is incorporated herein by reference.

BACKGROUND

1. Field

Embodiments of the present disclosure relate to a vehicle, and more particularly to a technology for presetting channels of a radio embedded in a vehicle.

2. Description of the Related Art

Generally, a radio embedded in a vehicle (hereinafter referred to as an in-vehicle radio) may receive radio broadcast signals in an indoor space of the vehicle so that the radio may enable a driver and passenger(s) who ride in the vehicle to listen to the radio broadcast signals. A radio preset function may automatically select frequencies of radio broadcast channels belonging to a specific broadcast band (e.g., AM, FM1, FM2, etc.) broadcast from a radio broadcast station, and may store the selected frequencies of the radio broadcast channels in a memory of a preset slot. Generally, the number of preset slots for each broadcast band is limited to about 6. In addition, when the driver of the vehicle selects any one of designated preset buttons (such as 1~6) in response to a plurality of preset frequency channels, the driver may listen to broadcast signals of a radio channel corresponding to a preset button selected from among a plurality of pre-stored broadcast channels.

A radio data system (RDS) for radio broadcast is a radio broadcast system configured to transmit a constant signal through residual frequencies of FM broadcasting. Since the RDS is mounted in a vehicle, the vehicle may perform character broadcast through a radio thereof while simultaneously utilizing a radio channel tuning function, such that a user who listens to radio broadcast signals need not perform re-tuning of radio channels whenever a frequency band is changed to another frequency band during long-distance travel.

However, in the case of using the radio broadcast system based on the RDS, when a reception state of RDS information contained in a broadcast signal is poor and a radio channel including no RDS information is used, the radio broadcast system is unable to use advantages of the RDS. In addition, when utilizing a preset function of RDS-based radio broadcast channels, preset channels may be unexpectedly initialized, such that a solution capable of addressing the above-mentioned issues is needed.

The disclosure of this section is to provide background of the invention. Applicant notes that this section may contain information available before this application. However, by providing this section, Applicant does not admit that any information contained in this section constitutes prior art.

SUMMARY

Therefore, it is an aspect of the present disclosure to provide a technology for sufficiently using advantages of a radio data system (RDS) in a radio broadcast system based on the RDS, and preventing unexpected initialization, etc. of a preset channel during utilization of a preset function.

Additional aspects of the invention will be set forth in part in the description which follows and, in part, will be obvious from the description, or may be learned by practice of the invention.

In accordance with an aspect of the present disclosure, a radio control method for a vehicle includes: receiving information about radio channel selection achieved by a preset function; and when the selected radio channel does not include radio data system (RDS) information, performing updating in a manner that a new radio channel including the RDS information is designated to the preset slot to which the selected radio channel has been designated.

The updating of the preset slot may include: searching for a preset slot to which a radio channel having the same program identification (PI) code as in the selected radio channel is designated, from among other preset slots excepting the preset slot to which the selected radio channel has been designated; and when a preset slot to which the radio channel having the same program identification (PI) code is designated is found, designating a broadcast name based on a program identification (PI) code of the found preset slot, as a broadcast name of the preset slot to which the selected radio channel has been designated.

The updating of the preset slot may include: acquiring RDS information of a radio channel in which a frequency of the selected radio channel is identical to a frequency of a preset channel retrieved from a current position of the vehicle; and designating the acquired RDS information as new RDS information of the preset slot to which the selected radio channel has been designated.

The radio control method may further include: acquiring the RDS information from a remote server configured to provide radio channel information.

Communication between the vehicle and the server may be achieved through an application (App) of a mobile device.

The updating of the preset slot may include: acquiring RDS information of another radio channel that has the same frequency and RDS information as those of the selected radio channel; and designating the acquired RDS information as new RDS information of the preset slot to which the selected radio channel has been designated.

The radio control method may further include acquiring the RDS information from a remote server configured to provide radio channel information.

Communication between the vehicle and the server may be achieved through an application (App) of a mobile device.

In accordance with another aspect of the present disclosure, a radio control system for a vehicle includes: a server configured to provide radio channel information; and a head unit configured to receive information about radio channel selection achieved by a preset function, and when the selected radio channel does not include radio data system (RDS) information, perform updating in a manner that a new radio channel including the RDS information is designated to the preset slot to which the selected radio channel has been designated.

The head unit may search for a preset slot to which a radio channel having the same program identification (PI) code as in the selected radio channel is designated, from among other preset slots excepting the preset slot to which the selected radio channel has been designated. When a preset slot to which the radio channel having the same program identification (PI) code is designated is found, the head unit may designate a broadcast name based on a program identification (PI) code of the found preset slot, as a broadcast name of the preset slot to which the selected radio channel has been designated, thereby updating the preset slot.

The head unit may include: acquiring RDS information of a radio channel in which a frequency of the selected radio channel is identical to a frequency of a preset channel retrieved from a current position of the vehicle; and designating the acquired RDS information as new RDS information of the preset slot to which the selected radio channel has been designated, thereby updating the preset slot.

Communication between the vehicle and the server may be achieved through an application (App) of a mobile device.

The head unit may include: acquiring RDS information of another radio channel that has the same frequency and RDS information as those of the selected radio channel; and designating the acquired RDS information as new RDS information of the preset slot to which the selected radio channel has been designated, thereby updating the preset slot.

Communication between the vehicle and the server may be achieved through an application (App) of a mobile device.

In accordance with another aspect of the present disclosure, a radio control method for a vehicle includes: receiving information about radio channel selection achieved by a preset function; when the selected radio channel does not include radio data system (RDS) information, searching for a preset slot to which a radio channel that has the same program identification (PI) code as in the selected radio channel, from among other preset slots excepting the preset slot to which the selected radio channel has been designated; and when the preset slot to which the radio channel having the same program identification (PI) code is designated is found, designating a broadcast name based on a program identification (PI) code of the found preset slot, as a broadcast name of the preset slot to which the selected radio channel has been designated, thereby updating the preset slot.

The radio control method may further include: acquiring RDS information of a radio channel in which a frequency of the selected radio channel is identical to a frequency of a preset channel retrieved from a current position of the vehicle; and designating the acquired RDS information as new RDS information of the preset slot to which the selected radio channel has been designated, thereby updating the preset slot to which the selected radio channel has been designated.

In accordance with another aspect of the present disclosure, a radio control method for a vehicle includes: receiving information about radio channel selection achieved by a preset function; when the selected radio channel does not include radio data system (RDS) information, searching for a preset slot to which a radio channel that has the same program identification (PI) code as in the selected radio channel, from among other preset slots excepting the preset slot to which the selected radio channel has been designated, and when the preset slot to which the radio channel having the same program identification (PI) code is designated is found, designating a broadcast name based on a program identification (PI) code of the found preset slot, as a broadcast name of the preset slot to which the selected radio channel has been designated; acquiring RDS information of a radio channel in which a frequency of the selected radio channel is identical to a frequency of a preset channel retrieved from a current position of the vehicle, and designating the acquired RDS information as new RDS information of the preset slot to which the selected radio channel has been designated; and acquiring RDS information of another radio channel that has the same frequency and RDS information as those of the selected radio channel, and designating the acquired RDS information as new RDS information of the preset slot to which the selected radio channel has been designated.

The radio control method may further include: acquiring the RDS information from a remote server configured to provide radio channel information.

Communication between the vehicle and the server may be achieved through an application (App) of a mobile device.

BRIEF DESCRIPTION OF THE DRAWINGS

These and/or other aspects of the invention will become apparent and more readily appreciated from the following description of embodiments, taken in conjunction with the accompanying drawings of which.

DETAILED DESCRIPTION

Figure 1:
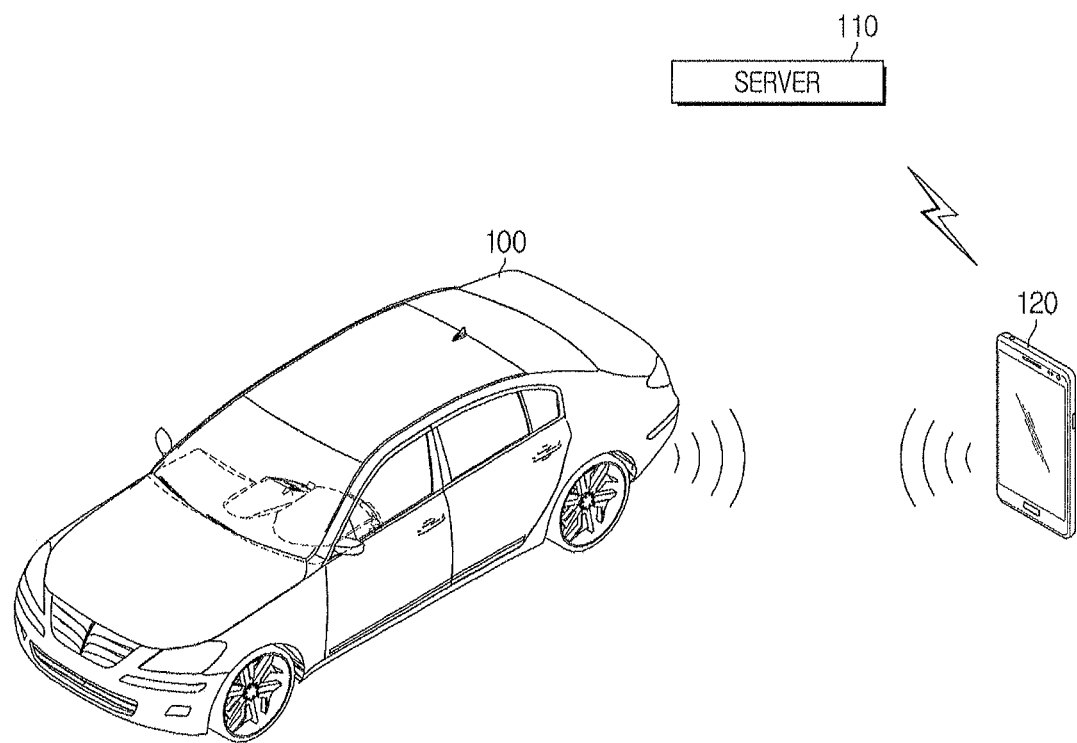
FIG. 1 is a view illustrating a vehicle control system according to an embodiment of the present disclosure.

Reference will now be made in detail to certain embodiments of the present disclosure, examples of which are illustrated in the accompanying drawings, wherein like reference numerals refer to like elements throughout.

Disclosed in a method for updating a preset slot (channel preset) of a radio in a vehicle. In response to the driver's input to store the current radio channel of the radio to a preset slot, a controller of the radio stores, on a memory corresponding to the preset slot, the frequency of the current channel along with the current channel's name available from radio data system (RDS) data of the current channel.

In embodiments, when RDS data is not available, the frequency of the current channel is stored as the name of the preset slot and displayed on a display of the vehicle connected to the radio. Subsequently, in response to the driver's selection of the preset slot (preset channel), a controller of the radio checks availability of RDS data for a radio channel stored in the preset slot, and updates the name of the preset slot using RDS data available. Subsequently, the updated name is displayed replacing the frequency of the preset channel.

In embodiments, in response to the driver's selection of the preset slot, when program identifier (PI) is available for the preset channel, a controller scans for alternative radio channel that has the same radio PI as the preset channel. If another radio channel having the same PI has a stronger signal reception than the preset channel, the controller changes the frequency of the preset slot with the frequency of the newly scanned alternative channel.

FIG. 1 is a view illustrating a vehicle control system according to an embodiment of the present disclosure.

Referring to FIG. 1, a vehicle 100 may include a radio function. That is, the vehicle 100 receives radio broadcast signals using the radio function of a head unit (230 of FIG. 2) embedded in the vehicle 100, and outputs the received radio broadcast signals through a speaker, such that passengers of the vehicle 100 may listen to the radio broadcast signals. The head unit 230 will be described later with reference to FIG. 2.

A server 110 may store information associated with radio broadcast, and may provide a user with the radio broadcast associated information. The vehicle 100 may receive the radio broadcast associated information by communicating with the server 110.

A mobile device 120 may operate as a communication medium between the vehicle 100 and the server 110. That is, the vehicle 100 may request the radio broadcast associated information from the server 110 through the mobile device 120, and the server 110 may provide the radio broadcast associated information requested by the vehicle 100 through the mobile device 120.

The vehicle 100 and the mobile device 120 may be connected to each other through short range wireless communication or a USB cable. Here, the short range wireless communication may include Bluetooth communication or Wi-Fi communication.

Figure 2:
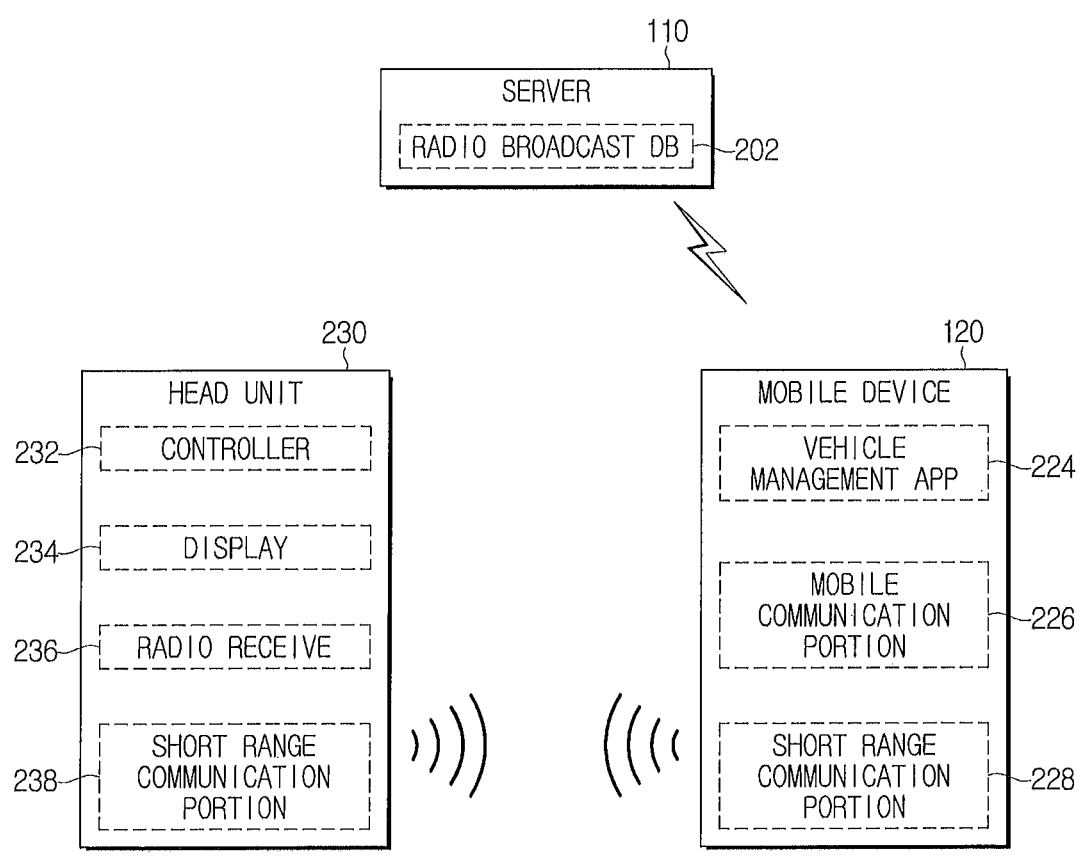
FIG. 2 is a detailed block diagram illustrating the vehicle control system shown in FIG. 1.

FIG. 2 is a detailed block diagram illustrating the vehicle control system shown in FIG. 1.

Referring to FIG. 2, a head unit 230 is a multimedia device embedded in the vehicle 100, may basically include a radio function, and may perform various audio/video/navigation (AVN) associated functions. The head unit 230 may include a controller 232, a display 234, a radio receiver 236, and a short-range communication portion 238.

The controller 232 of the head unit 230 may control overall operation of the head unit 230. For example, the controller 232 may control a process for receiving radio broadcast signals and outputting the received radio broadcast signals through a speaker. To this end, the controller 232 may receive a radio channel selection signal from a user, and may control reception of the user-selected radio broadcast signal. When the radio channel is a channel including RDS (Radio Data System) information, the controller 232 may also process the RDS information. The RDS is a technology for loading digital information on FM frequencies and then transmitting the resultant information. The RDS technology may be used to implement character broadcast, traffic information, frequency switching, etc. for use in vehicle audio devices. Although a user who is listening to radio broadcast signals within a certain region moves to another region, the frequency switching technology may allow the user to successively listen to the same radio broadcast signals irrespective of regional limitations. For this purpose, an alternative frequencies (AF) concept may be used. The alternative frequency (AF) concept is a list of different frequencies through which the same broadcast signals are emitted. When the vehicle 100 moves from one region (first region) to another region (second region) due to long distance movement, radio broadcast signals having been received by the audio embedded in the vehicle 100 within the first region may not be received by the audio within the second region. In this case, the RDS may automatically search for the list of alternative frequencies (AF List), and may perform switching to a broadcast channel having the best reception (Rx) state, such that the user who rides in the vehicle 100 may successively listen to the same broadcast signals irrespective of regional limitations.

In addition, the controller 232 of the head unit 230 may be involved in preset setting and management of radio channels. The preset setting and management in the head unit 230 will be described later with reference to FIG. 3.

The display 234 may display information associated with a current operation of the head unit 230. For example, when the user desires to listen to radio broadcast signals, the display 234 may display not only a screen image for selecting (tuning) a radio channel associated with the desired radio broadcast signals but also information about a plurality of preset channels.

The radio receiver 236 may receive radio broadcast signals, may perform filtering and decoding of the received radio broadcast signals, and may output the resultant radio broadcast signals through a speaker.

The short-range communication portion 238 may implement short range wireless communication between the vehicle 100 and the mobile device 120. The short-range wireless communication may include Bluetooth communication or Wi-Fi communication.

The server 110 may include a radio broadcast database (DB) 202. The server 110 may be a radio Domain Name System (DNS) server. The radio DNS server may receive a radio broadcast signal, may search for an Internet address of an interactive service corresponding to a radio station (i.e., a radio broadcast station) selected (or tuned) by the radio receiver connected to the Internet, and may thus search for a web resource based on a broadcast parameter such as an identifier (ID) of the radio station.

The radio broadcast DB 202 of the server 110 may store broadcast associated information of a plurality of radio channels. When the head unit 230 of the vehicle 100 outputs an information request, the radio broadcast DB 202 may provide the head unit 230 of the vehicle 100 with the corresponding broadcast associated information through a communication network. For example, the information stored in the radio broadcast DB 202 of the server 110 may include information about frequencies, service positions (service regions), and RDS of the respective radio broadcast channels.

The mobile device 120 may operate as a communication medium between the vehicle 100 and the server 110. That is, when a signal for requesting information associated with a specific radio channel occurs in the vehicle 100, the mobile device 120 transmits the requested signal to the server 110, receives information from the server 110, and transmits the received information to the head unit 230.

To this end, a vehicle management application (App) 224 may be installed in the mobile device 120, and the mobile device 120 may include a mobile communication portion 226 and a short-range communication portion 228. The vehicle management App 224 may allow the user to control the vehicle 100 or take associated information through the mobile device 120. When an information request signal occurs in the head unit 230 of the vehicle 100, the vehicle management App 224 may transmit the requested signal to the server 110, may receive the corresponding broadcast associated information from the server 110, and may transmit the received broadcast associated information to the head unit 230 of the vehicle 100. The information, which is transmitted from the server 110 to the head unit 230 through the mobile device 120, may include not only frequencies and service positions (regions) of the respective radio broadcast channels but also RDS associated information of the respective radio broadcast channels.

The mobile communication portion 226 may allow the mobile device 120 to communicate with another over a mobile communication network. The mobile device 120 communicates with the server 110 over the mobile communication network, such that the mobile device 120 may transmit a signal for requesting information to the server 110 and may receive the requested information from the server 110.

The short-range communication portion 238 may implement short range wireless communication between the vehicle 100 and the mobile device 120. The short-range wireless communication may include Bluetooth communication or Wi-Fi communication.

FIG. 3 is a view illustrating a radio channel selection/setting screen image displayed on the display of the head unit shown in FIG. 2. A detailed description of reference numerals illustrated in FIG. 3 is as follows.

Referring to FIG. 3, the reference number 314 may denote a plurality of preset slots. Unique numbers (1, 2, . . . , 6) may be allocated to the respective preset slots 314. The respective preset slots 314 may be distinguished from one another through the respective unique numbers (1, 2, . . . , 6). Frequencies and broadcast names of the respective radio channels may be displayed on the respective preset slots 314. A preset function of the radio channels may denote a function for presetting frequencies or broadcast names (or broadcast station names) of specific radio channels to the respective preset slots 314. The user may easily and conveniently select (or tune) a desired radio channel by manipulating the preset slots 314 to which frequencies or broadcast names of specific radio channels are preset through the preset function.

The reference number 302 may denote a preset slot on which a frequency is displayed. A frequency 96.00 MHz of the radio broadcast may be displayed on the preset slot 302 having the unique number 5. The preset slot 302 having the radio broadcast frequency 96.00 MHz may display only frequency information because RDS information is not guaranteed at a preset time of the radio channel. Unguaranteed RDS information may denote a channel that does not originally include RDS information, or may denote a channel that includes RDS information but stores only frequency information at a preset time because the RDS information is not guaranteed at the preset time. The above-mentioned case in which the channel having RDS information is used but the remaining information other than the RDS information is preset and stored is as follows. For example, assuming that the channel includes RDS information and the user stores the preset channel prior to reception of the RDS information, only frequency information other than the RDS information may be stored in the corresponding preset slot. A short time may be consumed to decode RDS information indicating digital data. If the preset storage operation is achieved prior to decoding of RDS information, only the frequency information other than the RDS information may be stored in the corresponding preset slot. In another example, assuming that the channel includes RDS information and a reception (Rx) strength of the radio broadcast signal is low at the preset storage time, the corresponding preset slot may store only frequency information other than RDS information due to non-reception of the RDS information. In accordance with an embodiment, RDS information is reflected in a radio channel including the RDS information, and the resultant radio channel is stored in the preset slots 314. In addition, an radio channel in which the RDS information is not confirmed may acquire either the RDS information or alternative information of the RDS information, and may store the acquired information as a preset channel, such that undesirable initialization of the preset slots 314 is prevented and more definite RDS information is contained and stored in the preset channel.

Reference number 304 may denote a preset slot on which a broadcast name based on RDS information is displayed. For example, when the broadcast name (broadcast station name) stored in the preset slot 304 is denoted by MBC, the preset slot 304 may display the broadcast station name 'MBC' instead of frequency information.

The reference number 306 may denote a frequency tuning button (descending order). Whenever the user touches the frequency tuning button 306, the frequencies may be changed in descending order in units of 0.01 MHz. Alternatively, while the user touches and holds the frequency tuning button 306, the frequencies may be changed in descending order in units of 0.01 MHz.

The reference number 308 may denote a frequency tuning button (ascending order). Whenever the user touches the frequency tuning button 308, the frequencies may be changed stepwise in ascending order in units of 0.01 MHz. Alternatively, while the user touches and holds the frequency tuning button 308, the frequencies May be changed in ascending order in units of 0.01 MHz.

Figure 3A:
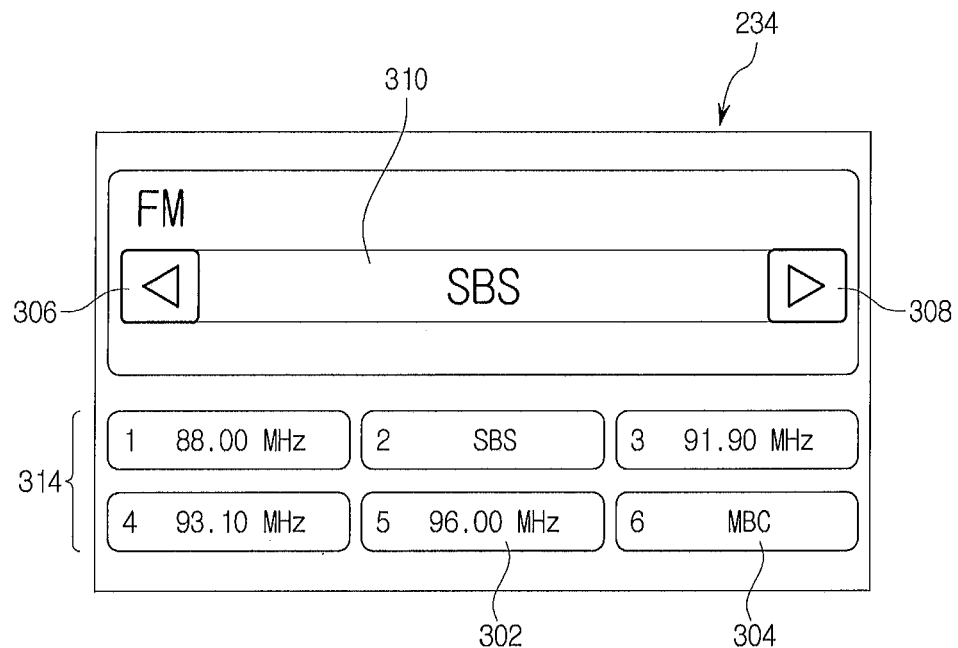
FIGS. 3A and 3B are views illustrating a radio channel selection/setting screen image displayed on a display of a head unit shown in FIG. 2.
Figure 3B:
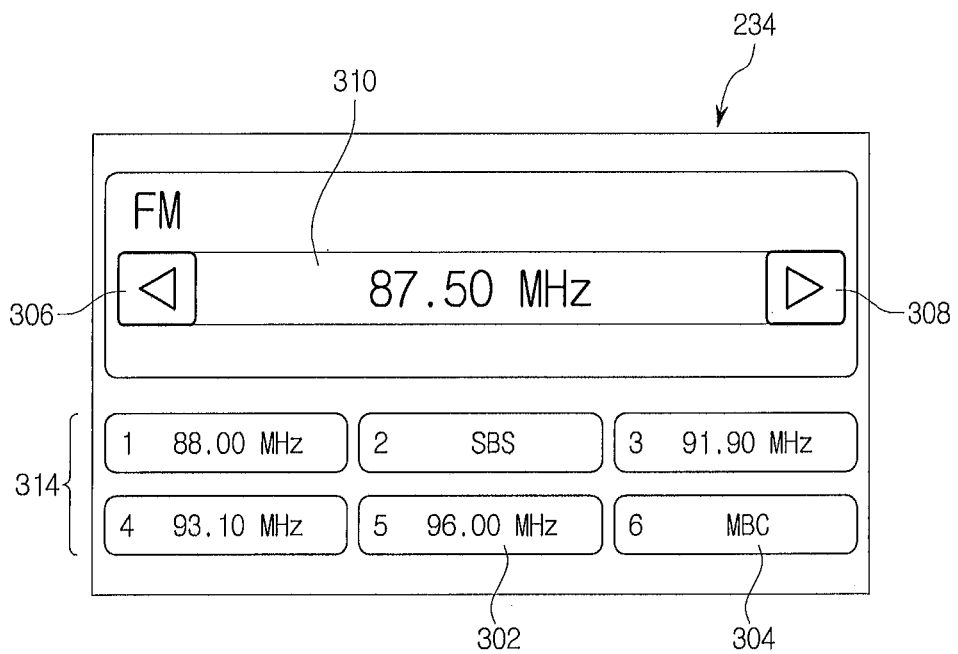

The reference number 310 may denote a channel information display. A currently-selected radio channel may be displayed on the channel information display 310. There are two methods for displaying channel information, as shown in FIGS. 3A and 3B. That is, as an example of displaying the channel information, a broadcast name (broadcast station name) may be displayed as shown in FIG. 3A, or frequency information may be displayed as shown in FIG. 3B.

Figure 4:
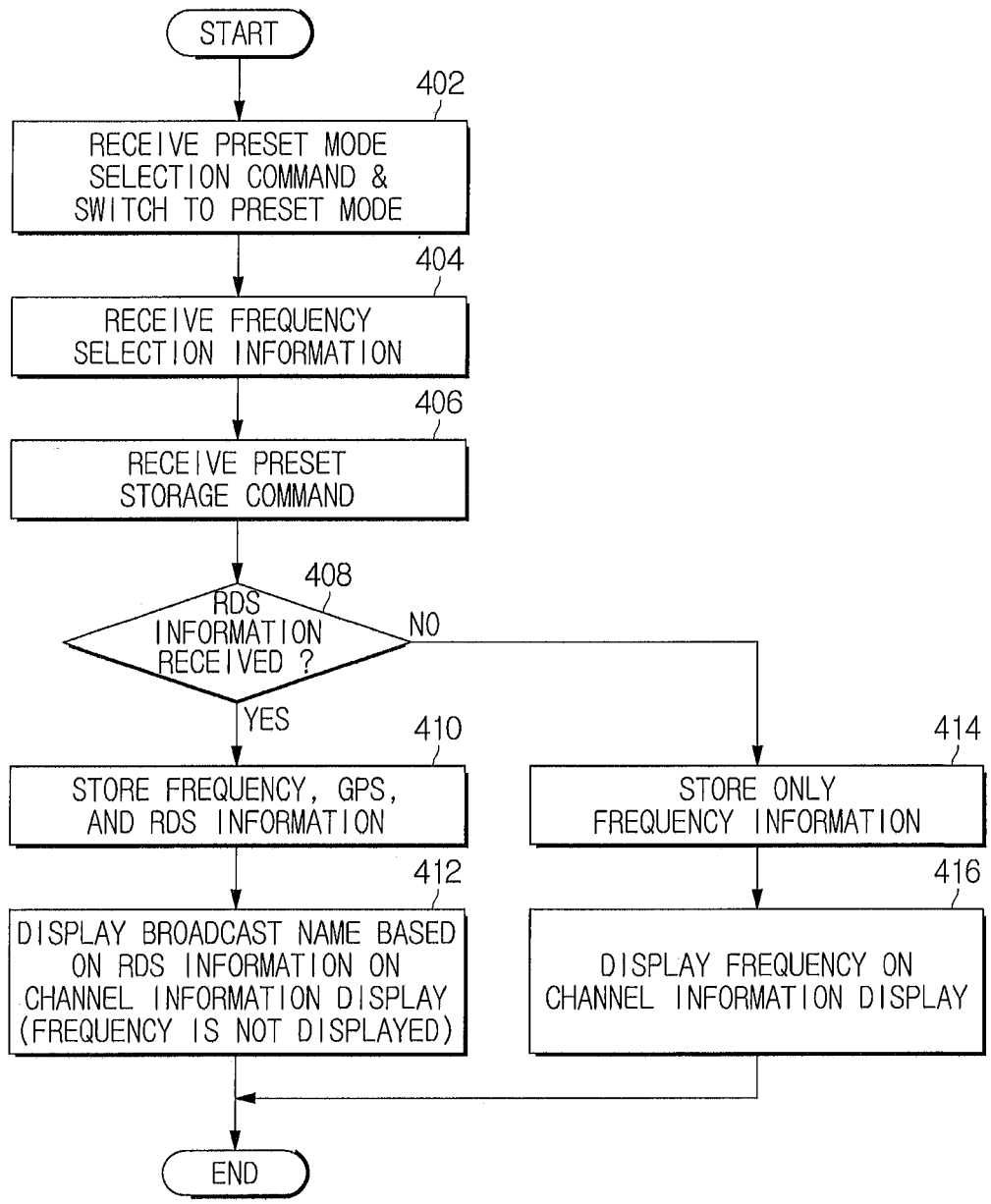
FIG. 4 is a flowchart illustrating a radio channel preset method for a vehicle according to an embodiment of the present disclosure.

FIG. 4 is a flowchart illustrating a radio channel preset method for the vehicle according to an embodiment of the present disclosure.

Referring to FIG. 4, when the head unit 230 of the vehicle 100 is in a radio mode, the controller 232 may receive a preset mode selection command from the user through the user interface (UI), and may control the head unit 230 to switch to a preset mode in response to the preset mode selection command of the user (402).

When the user selects (or tunes to) a frequency, the controller 232 may receive the user-selected frequency information (404). When the head unit 230 is in the preset mode, the user may select a desired frequency through manipulation of the frequency tuning button 306 or 308 shown in FIG. 3. As can be seen from FIG. 3B by manipulation of the frequency tuning buttons 306 and 308, a currently-selected frequency may be displayed on the channel information display 310.

When frequency selection is completed, the controller 232 may receive a preset storage command from the user (406). When the user touches and holds a desired preset slot (e.g., Preset Slot 2) from among the plurality of preset slots 314 on the condition that frequencies are established as shown in FIG. 3B, a currently-selected frequency may be stored in the preset slot 2.

At a reception time of the preset storage command, the controller 232 may confirm whether RDS information is contained in the preset storage channel (408). Although the corresponding radio channel is a channel having RDS information, if the user stores the preset channel prior to reception of the RDS information, or if the reception (Rx) strength of the radio broadcast signal is low at the preset storage time, the RDS information is not received such that only frequency information other than the RDS information may be stored in the corresponding preset slot. In this case, there is a possibility that the preset storage channel does not include RDS information therein.

If it is determined that the preset storage channel includes RDS information at the preset storage command reception time (Yes in 408), the controller 232 may store frequency, GPS, and RDS information of the user-selected radio channel in a memory designated in the corresponding preset slots 314 (410). GPS information may include time and position information obtained at the preset storage.

In addition, when the preset storage of a specific radio channel is completed, a broadcast name (e.g., SBS or MBC) based on RDS information of the corresponding radio channel may be displayed on the channel information display 310 of a preset list screen image (412). In Operation 412, frequency information is not displayed on the channel information display 310.

In contrast, if it is determined that the preset storage channel does not include RDS information at the preset storage command reception time (No in 408), the controller 232 may store only frequency information of the user-selected radio channel in a memory designated in the corresponding preset slots 314 (414).

When the preset storage of a specific radio channel is completed, only frequency information (e.g., 88.00 MHz or 91.90 MHz) of the corresponding radio channel may be displayed on the channel information display 310 of a preset list screen image (416).

Figure 5:
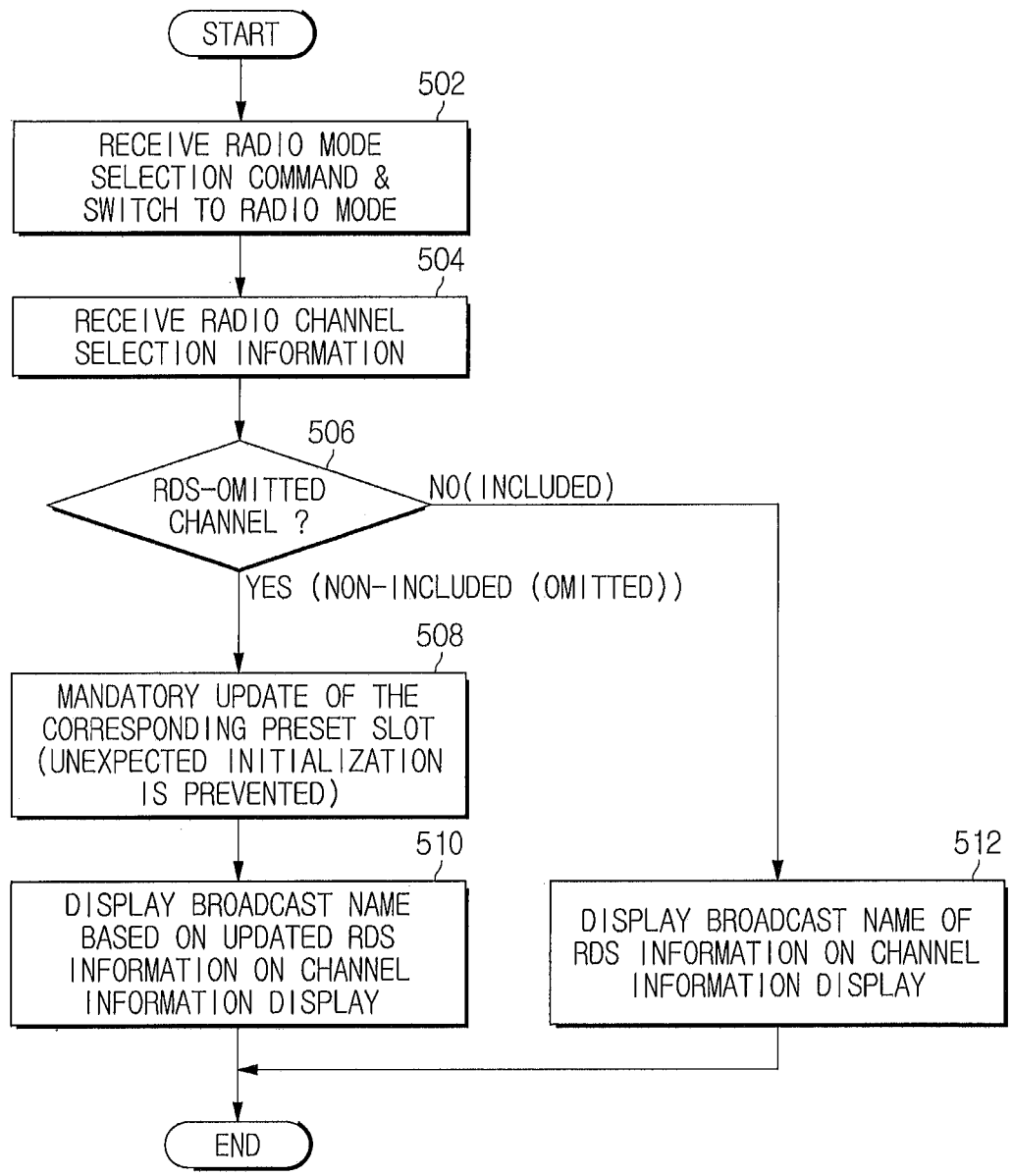
FIG. 5 is a flowchart illustrating a radio channel selection method for a vehicle according to an embodiment of the present disclosure.

FIG. 5 is a flowchart illustrating a radio channel selection method for a vehicle according to an embodiment of the present disclosure.

Referring to FIG. 5, when the user selects a radio mode by manipulating the head unit 230, the controller 232 may receive information about the selected radio mode through the user interface (UI), and may allow the head unit 230 to switch to the radio mode in response to the user-selected radio mode (502).

When the head unit 230 is in the radio mode, the user may select a desired radio channel, and the controller 232 may receive information about a user-selected radio channel (504). The user-selected radio channel may be obtained when a preset-stored radio channel is selected through selection of the preset slots 314.

When the radio channel is selected by the user, the controller 232 may confirm whether RDS information is not contained in the selected radio channel (506). In this case, the above-mentioned case in which RDS information is not contained in the selected radio channel may indicate that the corresponding radio channel does not originally include RDS information, or may indicate that, although the radio channel includes RDS information, the RDS information is omitted at the preset storage so that the resultant information is stored as a radio channel including no RDS information.

When the selected radio channel is a channel including no RDS information (i.e., RDS-omitted channel) (Yes in 506), the controller 232 may mandatorily update the corresponding preset slots 314 to prevent unexpected initialization of the corresponding preset slots 314 (508). The mandatory update of the preset slot 314 may indicate that the RDS-included channel is mandatorily designated as the corresponding preset slots 314. If the corresponding radio channel is a radio channel that does not originally include RDS information, the controller 232 may update storage content of the preset slots 314 by searching for an alternative radio channel including RDS information. Although the corresponding radio channel includes RDS information, assuming that the RDS information is omitted from the corresponding radio channel so that the RDS-omitted radio channel is stored, the controller 232 may search for RDS information of the corresponding radio information so that content stored in the preset slots 314 is updated with new content in which the found RDS information is reflected. That is, the controller 232 may search for original RDS information and may update information on the basis of the original RDS information, or may update a current channel with a radio channel including other RDS information capable of substituting for a selected radio channel.

The controller 232 may display a broadcast name (broadcast station name) based on RDS information of the updated preset channel 314 on the channel information display 310 of the preset list screen image (510).

Referring back to Operation 506, if the selected radio channel includes RDS information (No in 506), the controller 232 may display the broadcast name (broadcast station name) based on RDS information of the corresponding radio channel on the channel information display 310 (512). In this case, the corresponding radio channel has originally included RDS information and the RDS information has already been reflected in the corresponding radio channel, such that the controller 232 may reflect the stored RDS information in the corresponding radio channel and may display the broadcast name (broadcast station name) on the channel information display 310 (512).

Figure 6:
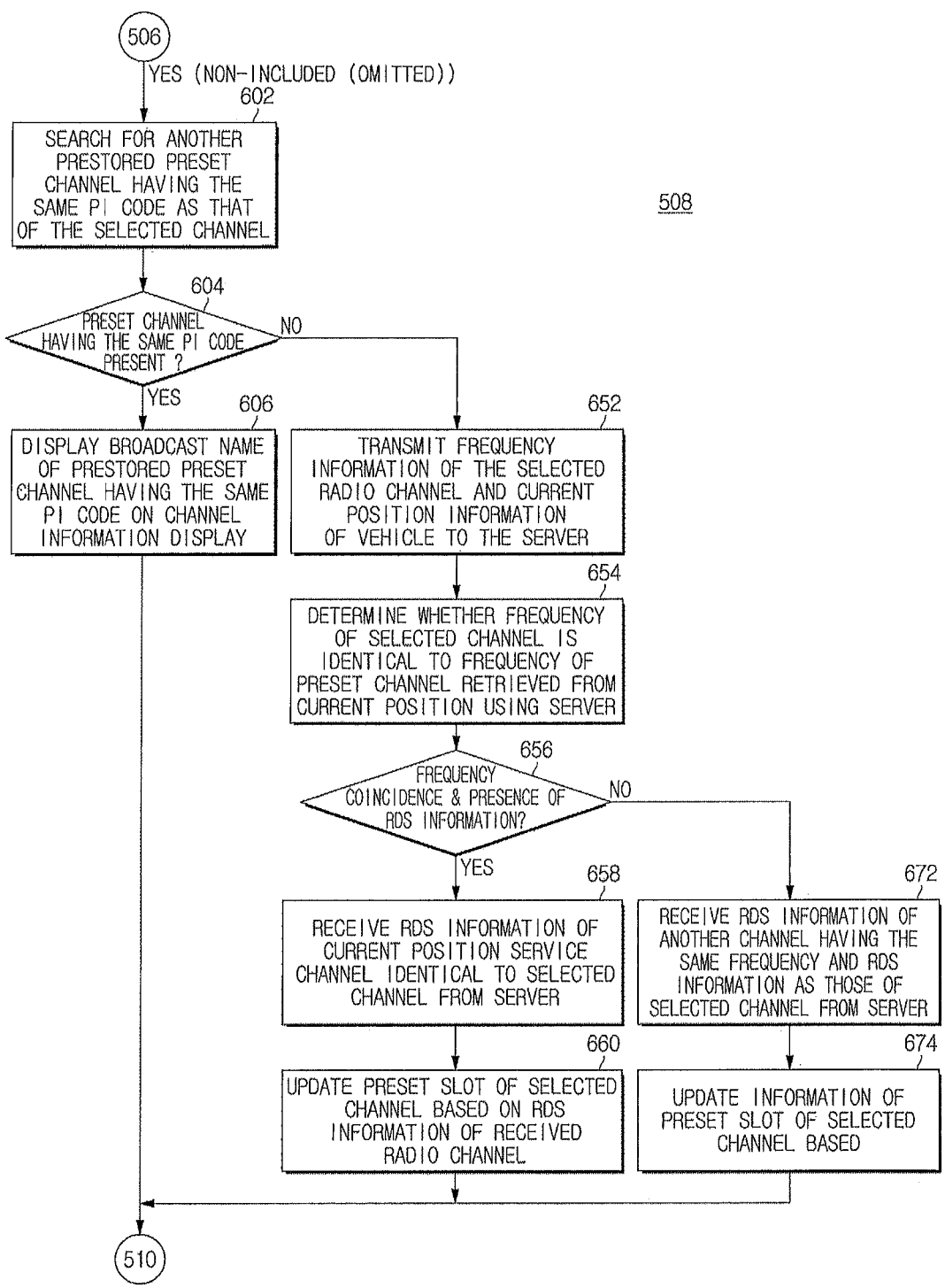
FIG. 6 is a flowchart illustrating a method for mandatorily updating a corresponding preset slot using the radio channel preset method shown in FIG. 5.

FIG. 6 is a flowchart illustrating a method for mandatorily updating a corresponding preset slot using the radio channel preset method shown in FIG. 5. Prior to description of FIG. 6, when the user-selected radio channel of FIG. 5 is an RDS-omitted channel (Yes in 506), the preset slots 314 are mandatorily updated (508) as shown in FIG. 5. In contrast, as shown in FIG. 6, the preset slots 314 are mandatorily updated (508) when the user-selected radio channel is the RDS-omitted channel (Yes in 506). In FIG. 6, the operations 602~606 may construct a single update method, and the operations 652~674 may construct another update method. If updating based on the operations 602~606 fails, updating based on the operations 652~674 may be performed. Updating based on the operations 652~674 may be achieved on the assumption of the environment that is capable of searching for the radio broadcast DB 202 of the server 110 through the vehicle management App 224 having already been executed in the mobile device 120 connected to the head unit 230.

The controller 232 may search for the other prestored preset channel, a program identification (PI) code of which is identical to that of the user-selected radio channel, so as to perform mandatory update (602).

Upon receiving the search resultant information, the controller 232 may determine which one of the preset slots 314 stores the radio channel having the same PI code as in the currently-selected radio channel (604).

If the presence of the other prestored preset channel having the same PI code as in the user-selected radio channel is decided (Yes in 604), the controller 232 may display a broadcast name (broadcast station name) based on the PI code of the other prestored preset channel on the channel information display 310 (606), without displaying information about the currently-selected radio channel on the channel information display 310. Since the user-selected radio channel has the same PI code as in the other prestored preset channel, content displayed on the channel information display 310 may be updated using the PI code of the other prestored preset channel.

Referring back to Operation 604, if the absence of the other prestored preset channel having the same PI code as in the user-selected radio channel is decided (No in 604), the controller 232 may perform update using another method. For this purpose, the controller 232 may transmit frequency information of the user-selected radio channel and current position information of the vehicle to the server (652).

Subsequently, the controller 232 may determine whether the frequency of the user-selected radio channel is identical to the frequency of the preset channel 314 retrieved from the current position of the vehicle 100, by referring to information stored in the radio broadcast DB 202 of the server 110 (654).

The controller 232 may determine the presence or absence of a radio channel in which a frequency of the user-selected radio channel is identical to a frequency of the preset slot 314 retrieved from the current position of the vehicle 100, and may also determine the presence or absence of RDS information of the radio channel (656).

If not only the radio channel in which the frequency of the user-selected radio channel is identical to the frequency of the preset channel 314 retrieved from the current position of the vehicle 100, but also RDS information of the radio channel is present (Yes in 656), the controller 232 may search for RDS information of the corresponding radio channel in the radio broadcast DB 202 of the server 110, and may receive the found RDS information (658).

The controller 232 may update information of the preset slot 314 of the user-selected radio channel on the basis of RDS information (e.g., PI code) of the received radio channel (660). Through such information update, the currently-selected preset slot 314 may occupy (store) not only frequency information but also the broadcast name (broadcast station name) based on the PI code of the RDS information. Therefore, the channel information display 310 may perform switching from a display mode of the frequency information to a display mode of the broadcast name (broadcast station name).

Referring back to Operation 656, when not only a radio channel in which a frequency of the user-selected radio channel is identical to a frequency of the preset channel 314 retrieved from the current position of the vehicle 100, but also RDS information of the radio channel is not present (No in 656), the controller 232 may receive RDS information of another radio channel having the same frequency and RDS information as those of the corresponding radio channel from the server 110 (672).

The controller 232 may update information of the preset slot 314 of the user-selected radio channel on the basis of RDS information (e.g., PI code) of the received radio channel (674). Through such information update, the currently-selected preset slot 314 may occupy (store) not only frequency information but also the broadcast name (broadcast station name) based on the PI code of the RDS information. Therefore, the channel information display 310 may perform switching from a display mode of the frequency information to a display mode of the broadcast name (broadcast station name).

Through mandatory update shown in FIG. 6, the preset slot 314 that has already stored only the frequency information may further include RDS information, such that the resultant preset slot 314 includes not only the frequency information but also the RDS information. Moreover, through such mandatory update, the preset slot that has already stored only the frequency information is prevented from being mandatorily initialized in the RDS-based radio system.

As is apparent from the above description, embodiments of the present invention may sufficiently use advantages of a radio data system (RDS) in the RDS-based radio broadcast system, and may prevent unexpected initialization of preset channels during utilization of the preset function in the RDS-based radio broadcast system.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A radio control method for a vehicle comprising:
   receiving information about radio channel selection achieved by a preset function; and
   when the selected radio channel does not include radio data system (RDS) information, performing updating in a manner that an alternative radio channel including the RDS information is designated to the preset slot to which the selected radio channel has been designated,
   wherein the selected radio channel is replaced with the alternative radio channel including the RDS information.

2. The radio control method according to claim 1, wherein the updating of the preset slot includes:
   searching for a preset slot to which a radio channel having the same program identification (PI) code as in the selected radio channel is designated, from among other preset slots excepting the preset slot to which the selected radio channel has been designated; and
   when a preset slot to which the radio channel having the same program identification (PI) code is designated is found, designating a broadcast name based on a program identification (PI) code of the found preset slot, as a broadcast name of the preset slot to which the selected radio channel has been designated.

3. The radio control method according to claim 1, wherein the updating of the preset slot includes:
   acquiring RDS information of a radio channel in which a frequency of the selected radio channel is identical to a frequency of a preset channel retrieved from a current position of the vehicle; and
   designating the acquired RDS information as new RDS information of the preset slot to which the selected radio channel has been designated.

4. The radio control method according to claim 3, further comprising:
   acquiring the RDS information from a remote server configured to provide radio channel information.

5. The radio control method according to claim 4, wherein:
   communication between the vehicle and the server is achieved through an application (App) of a mobile device.

6. The radio control method according to claim 1, wherein the updating of the preset slot includes:
   acquiring RDS information of another radio channel that has the same frequency and RDS information as those of the selected radio channel; and
   designating the acquired RDS information as new RDS information of the preset slot to which the selected radio channel has been designated.

7. The radio control method according to claim 6, further comprising:
   acquiring the RDS information from a remote server configured to provide radio channel information.

8. The radio control method according to claim 7, wherein:
   communication between the vehicle and the server is achieved through an application (App) of a mobile device.

9. A radio control system for a vehicle comprising:
   a server configured to provide radio channel information; and
   a head unit configured to receive information about radio channel selection achieved by a preset function, and when the selected radio channel does not include radio data system (RDS) information, perform updating in a manner that an alternative radio channel including the RDS information is designated to the preset slot to which the selected radio channel has been designated,
   wherein the selected radio channel is replaced with the alternative radio channel including RDS information.

10. The radio control system according to claim 9, wherein:
    the head unit searches for a preset slot to which a radio channel having the same program identification (PI) code as in the selected radio channel is designated, from among other preset slots excepting the preset slot to which the selected radio channel has been designated; and
    the head unit, when a preset slot to which the radio channel having the same program identification (PI) code is designated is found, designates a broadcast name based on a program identification (PI) code of the found preset slot, as a broadcast name of the preset slot to which the selected radio channel has been designated, thereby updating the preset slot.

11. The radio control system according to claim 9, wherein the head unit includes:
    acquiring RDS information of a radio channel in which a frequency of the selected radio channel is identical to a frequency of a preset channel retrieved from a current position of the vehicle; and
    designating the acquired RDS information as new RDS information of the preset slot to which the selected radio channel has been designated, thereby updating the preset slot.

12. The radio control system according to claim 9, wherein communication between the vehicle and the server is achieved through an application (App) of a mobile device.

13. The radio control system according to claim 9, wherein the head unit includes:
    acquiring RDS information of another radio channel that has the same frequency and RDS information as those of the selected radio channel; and
    designating the acquired RDS information as new RDS information of the preset slot to which the selected radio channel has been designated, thereby updating the preset slot.

14. The radio control system according to claim 13, wherein communication between the vehicle and the server is achieved through an application (App) of a mobile device.

15. A radio control method for a vehicle comprising:
    receiving information about radio channel selection achieved by a preset function;
    when the selected radio channel does not include radio data system (RDS) information, searching for a preset slot to which a radio channel that has the same program identification (PI) code as in the selected radio channel, from among other preset slots excepting the preset slot to which the selected radio channel has been designated; and
    when the preset slot to which the radio channel having the same program identification (PI) code is designated is found, designating a broadcast name based on a program identification (PI) code of the found preset slot, as a broadcast name of the preset slot to which the selected radio channel has been designated, thereby updating the preset slot.

16. The radio control method according to claim 15, further comprising:
    acquiring RDS information of a radio channel in which a frequency of the selected radio channel is identical to a frequency of a preset channel retrieved from a current position of the vehicle; and
    designating the acquired RDS information as new RDS information of the preset slot to which the selected radio channel has been designated, thereby updating the preset slot to which the selected radio channel has been designated.

* * * * *